(12) United States Patent  
Smith et al.

(10) Patent No.: US 8,787,335 B2  
(45) Date of Patent: *Jul. 22, 2014

(54) INTELLEGENT DELIVERY AGENT FOR SHORT MESSAGE DISTRIBUTION CENTER

(75) Inventors: Richard A. Smith, Annapolis, MD (US); Michael Dewey, Arnold, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 78 days.

This patent is subject to a terminal disclaimer.

(21) Appl. No.: 12/926,857

(22) Filed: Dec. 14, 2010

(65) Prior Publication Data

US 2011/0085531 A1     Apr. 14, 2011

Related U.S. Application Data

(63) Continuation of application No. 11/025,902, filed on Jan. 3, 2005, now Pat. No. 7,860,068, which is a continuation of application No. 09/832,012, filed on Apr. 11, 2001, now Pat. No. 6,839,562.

(60) Provisional application No. 60/196,097, filed on Apr. 11, 2000, provisional application No. 60/196,101, filed on Apr. 11, 2000.

(51) Int. Cl.

| H04W 4/00 | (2009.01) |
|---|---|
| H04W 4/14 | (2009.01) |
| H04L 12/58 | (2006.01) |
| H04M 3/487 | (2006.01) |
| H04M 3/42 | (2006.01) |
| H04W 88/18 | (2009.01) |
| H04M 3/533 | (2006.01) |
| H04M 7/12 | (2006.01) |
| H04M 3/53 | (2006.01) |
| H04W 4/12 | (2009.01) |

(52) U.S. Cl.  
CPC ...... H04W 88/184 (2013.01); *H04M 2203/205* (2013.01); *H04M 7/12* (2013.01); H04W 4/14 (2013.01); *H04M 2203/2016* (2013.01); *H04L 12/5895* (2013.01); *H04M 3/5322* (2013.01); H04M 3/4872 (2013.01); H04M 3/42382 (2013.01); *H04W 4/12* (2013.01); *H04L 12/5855* (2013.01); H04L 51/38 (2013.01); H04M 3/533 (2013.01); H04M 3/53316 (2013.01); *H04M 2207/18* (2013.01)  
USPC ...... 370/338; 455/433; 455/435.1; 455/422.1

(58) Field of Classification Search  
CPC ................................. H04W 4/12; H04W 4/14  
USPC ...................................... 370/338, 433, 435.1  
See application file for complete search history.

(56) References Cited

U.S. PATENT DOCUMENTS

| 5,410,598 A | 4/1995 | Shear | |
|---|---|---|---|
| 5,628,051 A * | 5/1997 | Salin | ............................. 455/433 |

(Continued)

OTHER PUBLICATIONS

3rd Generation Partnership Project, 3G TS 23.040 V3.4.0 (Mar. 2000)—Technical Specification; Technical Specification Group Terminals; Technical Realization of the Short Message Service (SMS), , Last Modified Mar. 30, 2000, pp. 1-125.

(Continued)

*Primary Examiner* — Farah Faroul  
(74) *Attorney, Agent, or Firm* — William H. Bollman

(57) ABSTRACT

A message distribution center (MDC) and Intelligent Delivery Agent are implemented in a wireless Internet gateway interposed between content providers and a wireless carrier to subjectively examine and direct messages via simple mail transfer protocol (SMTP) based on desired rules (e.g., non-peak hours, paying subscribers only, etc.) using standard SMTP Gateway and other well-known protocols. The MDC includes an individual queue for each subscriber, and the provider is informed through conventional SMTP protocol messages that the short message has been accepted. If the carrier has specifically disallowed service for a particular mobile identification number (MIN) (e.g., in the case of churning), then the content provider is informed through an SMTP interchange that the recipient is invalid.

11 Claims, 3 Drawing Sheets

(56) References Cited

U.S. PATENT DOCUMENTS

| | | | |
|---|---|---|---|
| 5,682,600 A * | 10/1997 | Salin | 455/422.1 |
| 5,719,918 A * | 2/1998 | Serbetciouglu et al. | 380/271 |
| 5,754,636 A | 5/1998 | Bayless | |
| 5,856,974 A | 1/1999 | Gervais | |
| 5,941,945 A | 8/1999 | Aditham | |
| 5,959,543 A | 9/1999 | LaPorta | |
| 5,960,074 A | 9/1999 | Clark | |
| 5,963,864 A | 10/1999 | O'Neil | |
| 6,023,470 A | 2/2000 | Lee | |
| 6,081,508 A | 6/2000 | West | |
| 6,131,024 A | 10/2000 | Boltz | |
| 6,134,432 A | 10/2000 | Holmes | |
| 6,175,922 B1 | 1/2001 | Wang | |
| 6,208,870 B1 | 3/2001 | Lorello | |
| 6,244,758 B1 | 6/2001 | Solymar | |
| 6,263,212 B1 * | 7/2001 | Ross et al. | 455/466 |
| 6,289,095 B1 | 9/2001 | Buttitta | |
| 6,301,695 B1 | 10/2001 | Burnham | |
| 6,314,108 B1 | 11/2001 | Ramasubramani | |
| 6,393,014 B1 * | 5/2002 | Daly et al. | 370/352 |
| 6,421,707 B1 | 7/2002 | Miller | |
| 6,421,733 B1 | 7/2002 | Tso | |
| 6,424,841 B1 * | 7/2002 | Gustafsson | 455/466 |
| 6,430,540 B1 | 8/2002 | Guidice | |
| 6,446,112 B1 | 9/2002 | Bunney | |
| 6,456,852 B2 | 9/2002 | Bar | |
| 6,459,892 B2 | 10/2002 | Burgan | |
| 6,487,180 B1 | 11/2002 | Borgstahl | |
| 6,493,430 B2 | 12/2002 | Leuca | |
| 6,512,930 B2 | 1/2003 | Sandegren | |
| 6,567,979 B1 | 5/2003 | deCarmo | |
| 6,625,461 B1 * | 9/2003 | Bertacchi | 455/466 |
| 6,654,786 B1 | 11/2003 | Fox | |
| 6,658,260 B2 | 12/2003 | Knotts | |
| 6,674,767 B1 | 1/2004 | Kadyk | |
| 6,681,257 B1 | 1/2004 | Patel | |
| 6,771,971 B2 * | 8/2004 | Smith | 455/456.1 |
| 6,826,597 B1 | 11/2004 | Lonroth | |
| 6,850,916 B1 | 2/2005 | Wang | |
| 6,993,325 B1 | 1/2006 | Waesterlid | |
| 7,010,303 B2 | 3/2006 | Lewis | |
| 7,058,036 B1 | 6/2006 | Yu | |
| 7,069,439 B1 | 6/2006 | Chen | |
| 7,171,190 B2 | 1/2007 | Ye | |
| 7,197,661 B1 | 3/2007 | Reynolds | |
| 7,224,696 B2 | 5/2007 | Bouleros | |
| 7,260,836 B2 | 8/2007 | Roskind | |
| 7,409,428 B1 | 8/2008 | Brabec | |
| 7,480,915 B2 | 1/2009 | Costa Requena | |
| 7,486,641 B2 | 2/2009 | Reddy | |
| 7,509,136 B2 | 3/2009 | Hart | |
| 7,519,654 B1 | 4/2009 | Smith | |
| 7,577,431 B2 | 8/2009 | Jiang | |
| 7,627,305 B2 | 12/2009 | Helferich | |
| 7,809,382 B2 | 10/2010 | Smith | |
| 7,860,068 B2 | 12/2010 | Smith | |
| 2001/0034224 A1 | 10/2001 | McDowell | |
| 2002/0143946 A1 | 10/2002 | Crosson | |
| 2003/0040300 A1 | 2/2003 | Bodic | |
| 2003/0092454 A1 | 5/2003 | Halim | |
| 2003/0105864 A1 | 6/2003 | Mulligan | |
| 2003/0163730 A1 | 8/2003 | Roskind | |
| 2003/0193967 A1 | 10/2003 | Fenton | |
| 2004/0148357 A1 | 7/2004 | Corrigan | |
| 2004/0196858 A1 | 10/2004 | Tsai | |
| 2004/0203756 A1 | 10/2004 | Lin | |
| 2005/0004968 A1 | 1/2005 | Mononen | |
| 2005/0064884 A1 | 3/2005 | Dumont | |
| 2005/0076084 A1 | 4/2005 | Loughmiller et al. | |
| 2005/0132060 A1 | 6/2005 | Mo | |
| 2005/0141522 A1 | 6/2005 | Kadar | |
| 2005/0164721 A1 | 7/2005 | Yeh | |
| 2005/0176409 A1 | 8/2005 | Carpenter | |
| 2006/0194595 A1 | 8/2006 | Myllynen | |
| 2009/0298521 A1 * | 12/2009 | Finlayson | 455/500 |
| 2010/0029312 A1 * | 2/2010 | Smith et al. | 455/466 |
| 2010/0257241 A1 | 10/2010 | Hale | |

OTHER PUBLICATIONS

3$^{rd}$ Generation Partnership Project, 3G TS 23.040 V3.10.0 (Jun. 2003)—Technical Specification; Technical Specification Group Terminals; Technical Realization of the Short Message Service (SMS), Last Modified Jun. 25, 2003, pp. 1-126.

3$^{rd}$ Generation Partnership Project, 3G TS 23.040 V3.4.0 (Mar. 2000)—Technical Specification; Technical Specification Group Terminals; Technical Realization of the Short Message Service (SMS); Point-to-Point (PP), Last Modified Mar. 30, 2000, pp. 1-125.

3$^{rd}$ Generation Partnership Project, 3G TS 23.040 V3.1.0 (Jul. 1999)—Technical Specification; Technical Specification Group Terminals; Technical Realization of the Short Message Service (SMS); Point-to-Point (PP), Last Modified Mar. 30, 2000, pp. 1-117.

3$^{rd}$ Generation Partnership Project, 3G TS 23.040 V3.2.0 (Oct. 1999)—Technical Specification; Technical Specification Group Terminals; Technical Realization of the Short Message Service (SMS); Point-to-Point (PP), Last Modified Mar. 30, 2000, pp. 1-118.

3$^{rd}$ Generation Partnership Project, 3G TS 23.040 V3.3.0 (Dec. 1999)—Technical Specification; Technical Specification Group Terminals; Technical Realization of the Short Message Service (SMS), 1999 Release, pp. 1-118.

3$^{rd}$ Generation Partnership Project, 3G TS 23.040 V3.4.1 (Apr. 2000)—Technical Specification; Technical Specification Group Terminals; Technical Realization of the Short Message Service (SMS);, Release 1999, pp. 1-125.

3$^{rd}$ Generation Partnership Project, 3G TS 23.040 V3.5.0 (Jul. 2000)—Technical Specification; Technical Specification Group Terminals; Technical Realization of the Short Message Service (SMS);, Release 1999, pp. 1-126.

3$^{rd}$ Generation Partnership Project, 3G TS 23.040 V3.6.0 (Sep. 2001)—Technical Specification; Technical Specification Group Terminals; Technical Realization of the Short Message Service (SMS);, Release 1999, pp. 1-126.

3$^{rd}$ Generation Partnership Project, 3G TS 23.040 V3.7.0 (Dec. 2001)—Technical Specification; Technical Specification Group Terminals; Technical Realization of the Short Message Service (SMS);, Release 1999, pp. 1-126.

3$^{rd}$ Generation Partnership Project, 3G TS 23.040 V3.8.0 (Mar. 2002)—Technical Specification; Technical Specification Group Terminals; Technical Realization of the Short Message Service (SMS); Release 1999, pp. 1-126.

3$^{rd}$ Generation Partnership Project, 3G Ts 23.040 V3.9.0 (Jun. 2002)—Technical Specification; Technical Specification Group Terminals; Technical Realization of the Short Message Service (SMS); Release 1999, pp. 1-126.

3$^{rd}$ Generation Partnership Project, 3G TS 23.040 V4.0.0 (Jul. 2000)—Technical Specification; Technical Specification Group Terminals; Technical Realization of the Short Message Service (SMS); Release 2000, pp. 1-126.

3$^{rd}$ Generation Partnership Project, 3G TS 23.040 V4.1.0 (Oct. 2002)—Technical Specification; Technical Specification Group Terminals; Technical Realization of the Short Message Service (SMS); Release 4, 2001, pp. 1-126.

3$^{rd}$ Generation Partnership Project, 3G TS 23.040 V4.2.0 (Mar. 2001)—Technical Specification; Technical Specification Group Terminals; Technical Realization of the Short Message Service (SMS); Release 4, 2001, pp. 1-126.

3$^{rd}$ Generation Partnership Project, 3G TS 23.040 V4.3.0 (Jun. 2001)—Technical Specification; Technical Specification Group Terminals; Technical Realization of the Short Message Service (SMS); Release 4, 2001, pp. 1-126.

3$^{rd}$ Generation Partnership Project, 3G TS 23.040 V4.4.0 (Sep. 2001)—Technical Specification; Technical Specification Group Terminals; Technical Realization of the Short Message Service (SMS); Release 4, 2001, pp. 1-128.

(56) References Cited

OTHER PUBLICATIONS

3rd Generation Partnership Project, 3G TS 23.040 V4.5.0 (Dec. 2001)—Technical Specification; Technical Specification Group Terminals; Technical Realization of the Short Message Service (SMS); Release 4, 2002, pp. 1-128.
3rd Generation Partnership Project, 3G TS 23.040 V4.6.0 (Dec. 2001)—Technical Specification; Technical Specification Group Terminals; Technical Realization of the Short Message Service (SMS); Release 4, 2002, pp. 1-128.
3rd Generation Partnership Project, 3G TS 23.040 V4.7.0 (Jun. 2002)—Technical Specification; Technical Specification Group Terminals; Technical Realization of the Short Message Service (SMS); Release 4, 2002, pp. 1-128.
3rd Generation Partnership Project, 3G TS 23.040 V4.8.0 (Jun. 2003)—Technical Specification; Technical Specification Group Terminals; Technical Realization of the Short Message Service (SMS); Release 4, 2003, pp. 1-128.
3rd Generation Partnership Project, 3G TS 23.040 V5.0.0 (Jun. 2001)—Technical Specification; Technical Specification Group Terminals; Technical Realization of the Short Message Service (SMS); Release 5, 2001, pp. 1-137.
3rd Generation Partnership Project, 3G TS 23.040 V5.1.0 (Sep. 2001)—Technical Specification; Technical Specification Group Terminals; Technical Realization of the Short Message Service (SMS); Release 5, 2001, pp. 1-137.
3rd Generation Partnership Project, 3G TS 23.040 V5.2.0 (Dec. 2001)—Technical Specification; Technical Specification Group Terminals; Technical Realization of the Short Message Service (SMS); Release 5, 2002, pp. 1-143.
3rd Generation Partnership Project, 3G TS 23.040 V5.3.0 (Mar. 2002)—Technical Specification; Technical Specification Group Terminals; Technical Realization of the Short Message Service (SMS); Release 5, 2002, pp. 1-178.
3rd Generation Partnership Project, 3G TS 23.040 V5.4.0 (Jun. 2002)—Technical Specification; Technical Specification Group Terminals; Technical Realization of the Short Message Service (SMS); Release 5, 2002, pp. 1-181.
3rd Generation Partnership Project, 3G TS 23.040 V5.5.0 (Sep. 2002)—Technical Specification; Technical Specification Group Terminals; Technical Realization of the Short Message Service (SMS); Release 5, 2002, pp. 1-181.
3rd Generation Partnership Project, 3G TS 23.040 V5.5.1 (Sep. 2002)—Technical Specification; Technical Specification Group Terminals; Technical Realization of the Short Message Service (SMS); Release 5, 2002, pp. 1-181.
3rd Generation Partnership Project, 3G TS 23.040 V5.6.0 (Jun. 2003)—Technical Specification; Technical Specification Group Terminals; Technical Realization of the Short Message Service (SMS); Release 5, 2003, pp. 1-181.
3rd Generation Partnership Project, 3G TS 23.040 V5.6.1 (Jun. 2003)—Technical Specification; Technical Specification Group Terminals; Technical Realization of the Short Message Service (SMS); Release 5, 2003, pp. 1-181.
3rd Generation Partnership Project, 3G TS 23.040 V6.0.0 (Sep. 2002)—Technical Specification; Technical Specification Group Terminals; Technical Realization of the Short Message Service (SMS); Release 6, 2002, pp. 1-182.
3rd Generation Partnership Project, 3G TS 23.040 V6.0.1 (Sep. 2002)—Technical Specification; Technical Specification Group Terminals; Technical Realization of the Short Message Service (SMS); Release 6, 2002, pp. 1-182.
3rd Generation Partnership Project, 3G TS 23.040 V6.1.0 (Jun. 2003)—Technical Specification; Technical Specification Group Terminals; Technical Realization of the Short Message Service (SMS); Release 6, 2003, pp. 1-182.
3rd Generation Partnership Project, 3G TS 23.040 V6.2.0 (Jun. 2003)—Technical Specification; Technical Specification Group Terminals; Technical Realization of the Short Message Service (SMS); Release 6, 2003, pp. 1-182.
Java-Centric Distributed Computing by Wollrath, A et al..; IEEE, vol. 17 Issue 3, May-Jun. 1997, pp. 44-53.
Appendix A, "Short Message Peer to Peer (SMPP) Interface Specification," 09588460, Jun. 6, 2000.
3rd Generation Partnership Project, ETSI TS 123 040 V4.2.0 (2001-2003), Technical Specification; Universal Mobile Telecommunications System (UMTS); Technical Realization of the Short Message Service (SMS), (3Gpp TS 23.040 version 4.2.0 Release 4), pp. 1-127.
3rd Generation Partnership Project, ETSI TS 123 040 V3.3.0 (Jan. 2000), Technical Specification; Universal Mobile Telecommunications System (UMTS); Technical Realization of the Short Message Service (SMS), (3G TS 23.040 version 3.3.0 Release 1999), pp. 1-117.
3rd Generation Partnership Project, ETSI TS 100-901 V7.5.0 (Dec. 2001), Technical Specification; Digital Cellular Telecommunications System (Phase 2+); Technical Realization of the Short Message Service (SMS) point-to-Point (PP), (3Gpp TS 03.40 version 7.5.0 Release 1998), pp. 1-119.
3rd Generation Partnership Project, ETSI TS 123 040 V3.5.0 (Jul. 2000), Technical Specification; Universal Mobile Telecommunications System (UMTS); Technical Realization of the Short Message Service (SMS) (3G TS 23.040 version 3..5.0 Release 1999), pp. 1-127.
3rd Generation Partnership Project, ETSI TS 123 040 V4.3.0 (Jun. 2001), Technical Specification; Digital Cellular Telecommunications system (Phase 2+)(GSM); Universal Mobile Telecommunications System (UMTS); Technical Realization of the Short Message Service (SMS) (3GPP TS 23.040 version 4.3.0 Release 4), pp. 1-127.

\* cited by examiner

INTELLEGENT DELIVERY AGENT FOR SHORT MESSAGE DISTRIBUTION CENTER

The present application is a continuation of U.S. Pat. No. 7,860,068, entitled "Intelligent Delivery Agent for Short Message Distribution Center," filed on Jan. 3, 2005 as application Ser. No. 11/025,902; which in turn is a continuation of U.S. Pat. No. 6,839,562, entitled "Intelligent Delivery Agent for Short Message Distribution Center," filed on Apr. 11, 2001 as application Ser. No. 09/832,012; which in turn claims priority from U.S. Provisional Patent Application No. 60/196,097, entitled "Message Distribution Center", filed on Apr. 11, 2000; and from U.S. Provisional Patent Application No. 60/196,101, entitled "Management Messaging Middleware", filed on Apr. 11, 2000, the entirety of all of which are expressly incorporated herein by reference.

BACKGROUND OF THE INVENTION

1. Field of the Invention

This invention relates generally to wireless carriers, Internet service providers (ISPs), and information content delivery services/providers. More particularly, it relates to Wireless Telecommunication, ANSI-41D Wireless Intelligent Network (WIN) applications, and SMTP protocol to manage information content for a wireless carrier.

2. Background of Related Art

There are many "wireless" information content providers in the industry who have some information or service that is considered of value to the mobile phone user. Wireless Carriers are typically in favor of these content providers as they add value to Short Messaging Systems (SMS) and can drive up SMS and voice usage.

Unfortunately, content providers may not fully understand a particular wireless network and/or may not be fully sensitized to particular needs of carriers. This is because the carrier is often seen simply as a 'pipe' through which wireless messages are sent using SMTP protocol. Content providers maintain their own subscriber lists, and typically communicate with carriers merely as e-mail hosts.

All traffic is typically sent through an SMTP gateway, and thus information content, ads, etc., cannot be differentiated from higher priority 'personal' content. Problems arising from this include:

Bulk information content can slow down and even jeopardize the carrier's SMTP Gateway performance;

Personal messages cannot be given a higher priority than bulk messages;

Bulk info content receives the same messaging parameters as personal messages, e.g., delivery receipts enabled, expiration date of 3-5 days, etc.;

The carrier cannot differentiate between bulk messages among various providers and personal mail for billing purposes;

Bulk senders deliver their content regardless of whether the device is on, and thus the carrier must handle message storage and retry attempts; and Bulk senders will typically continue to deliver content to churned wireless subscribers, wasting network resources and interfering with reuse of mobile numbers.

There is a need for a technique using SMTP and/or other conventional protocols to enable an easy way for content providers to distribute and/or differentiate their information without requiring them to change technologies.

BRIEF DESCRIPTION OF THE DRAWINGS

Features and advantages of the present invention will become apparent to those skilled in the art from the following description with reference to the drawings, in which.

SUMMARY OF THE INVENTION

Figure 1:
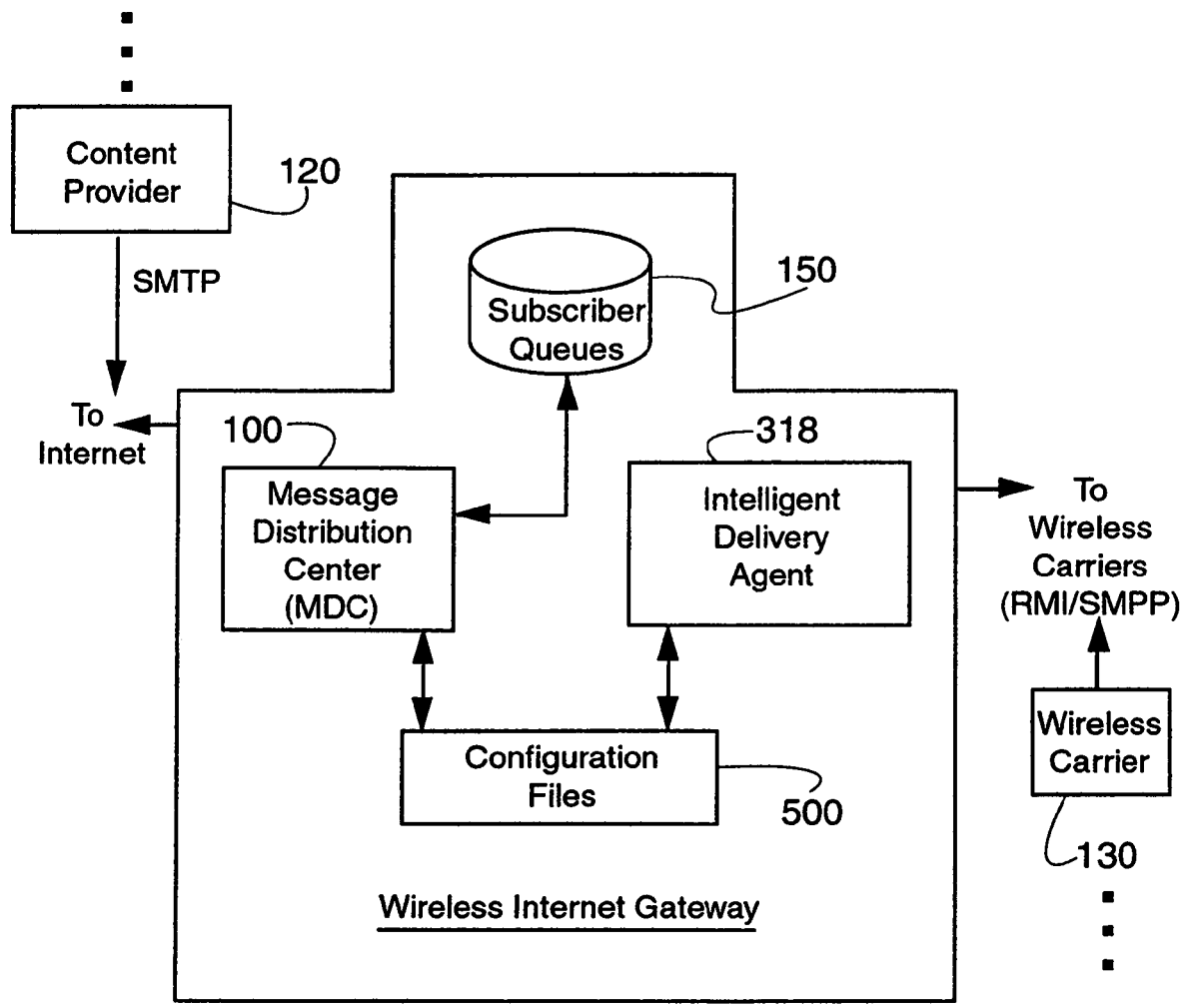
FIG. 1 shows a high level sequence diagram including a Message Distribution Center (MDC) enabling a Content Provider to direct messages via SMTP to the Message Distribution Center (MDC), in accordance with the principles of the present invention.

In accordance with the principles of the present invention, a message distribution center is interposed between a source of a short message and a wireless network including an intended recipient of the short message. The message distribution center comprises an SMTP protocol communication channel to receive the short message from the source of the short message. A plurality of subscriber queues are included, each corresponding to a different subscriber in the wireless network. The short message is placed in at least one of the plurality of subscriber queues before delivery to the wireless network. A communication channel communicates the short message to the wireless network.

In accordance with another aspect of the present invention, a method of throttling short messages to subscribers in a wireless network comprises forwarding a short message to a wireless network only when a receiving wireless device in said wireless network is known outside said wireless network to be online.

DETAILED DESCRIPTION OF ILLUSTRATIVE EMBODIMENTS

The present invention enables a Content Provider to direct messages via SMTP to an intermediatary Message Distribution Center (MDC) using standard SMTP Gateway and other well-known protocols.

In accordance with the principles of the present invention, short messages are inserted in the MDC into individual queues for each subscriber, and the provider is informed through conventional SMTP protocol messages that the short message has been accepted.

If the carrier has specifically disallowed service for a MIN (e.g., in the case of churning), then the content provider is informed through an SMTP interchange that the recipient is invalid. This encourages providers to discontinue service to terminated MINs, thereby reducing traffic to the MDC.

A Message Distribution Center (MDC) provides value to both wireless developers and wireless carriers. For instance, for the Wireless Developer, an MDC provides a single mechanism for interacting with subscribers of multiple carriers, regardless of each carrier's underlying infrastructure. For the carrier, an MDC can protect their SS7 network by intelligently throttling messages and configuring message delivery parameters to be more network friendly.

An MDC acts as a broker between carriers and developers. Different levels of relationships can be established with both carriers and developers, resulting in different levels of services that are available. The MDC interacts with a carrier's Short Message Service Center(s) (SMSCs) and/or SS7 network, allowing developers to guarantee message delivery, to interact with users via Mobile Terminated (MT) and Mobile Originated (MO) SMS, and possibly even to receive handset presence information.

Although the disclosed embodiments relate primarily to wireless services from the perspective of a Short Message Service (SMS), the disclosed MDC and related management middleware may support many types of wireless devices using the same API. For instance, suitable supported devices may include, e.g., 2-way Email pagers, the Palm VII™, and wireless application protocol (WAP) devices.

The disclosed MDC utilizes a Wireless Internet Gateway (WIG), which is a middleware messaging platform designed to facilitate communication between Internet devices and various wireless networks. A suitable WIG is disclosed in U.S. application Ser. No. 09/630,762 to SMITH, entitled "Wireless Internet Gateway", filed Aug. 2, 2000, the entirety of which is expressly incorporated herein by reference.

FIG. 1 shows a high level sequence diagram including a Message Distribution Center (MDC) enabling a Content Provider to direct messages via SMTP to the Message Distribution Center (MDC), in accordance with the principles of the present invention.

In particular, as shown in FIG. 1, an MDC gateway (MDC) 100 and Intelligent Delivery Agent (IDA) 318 are placed intermediary between a content provider 120 and a wireless carrier 130, to allow management of message delivery for each of a plurality of subscribers.

There are two main programs. The first application program is the MDC Gateway 100, which is essentially a Wireless Internet Gateway to check for and process information provider messages as shown and described herein. The second application program is the Intelligent Delivery Agent (IDA) 318, As shown in FIG. 1, the content provider 120 communicates with the MDC 100 using SMTP protocol messages, and the MDC communicates with the wireless carrier 130 preferably using RMI/SMPP techniques. A plurality of configuration files 500 configured by an appropriate system administrator control parameters in the MDC 100 and IDA 318.

Importantly, the MDC 100 includes a plurality of subscriber queues 150, preferably one for each subscriber having MDC support. The subscriber queues 150 may be integrated within the gateway of the MDC 100, or may be external to the gateway of the MDC 100 but nevertheless in direct communication with the gateway of the MDC 100.

The subscriber queue 150 preferably follows a First In First Out (FIFO) model, where the oldest messages are delivered first.

In accordance with the principles of the present invention, a particular wireless carrier 130 assigns a value for the maximum number of outstanding messages for a particular subscriber. This maximum number of outstanding messages can be used to establish a queue threshold. Thus, if one or more new messages cause the queue threshold to be exceeded, then the oldest messages may be deleted first from the particular subscriber queue 150 to make room for the new message(s). Of course, the subscriber queue 150 may be expanded in size as desired.

To provide protection from constantly growing subscriber queues 150, other rules may be established by the wireless carrier 130 to allow automatic deletion of particular messages from the subscriber queue 150.

For instance, an expiration period may be established whereby all messages more than x days old are removed. The expiration period may be established, e.g., on an individual subscriber basis (e.g., different subscription plans allowing larger queues and/or longer storage times), or on a global basis (e.g., all subscribers in a particular wireless network have a similar expiration time).

The use of automatic deletion of short messages from subscriber queues 150 is important, e.g., in the case of churned MINs, so that a new subscriber does not receive lingering messages from a previous subscriber with the same MIN.

Short messages to subscriber queues 150 may be delivered independently from one another and/or message delivery times spaced apart, thereby distributing message load over time and minimizing the negative effects of batch messaging on the wireless network.

The MDC 100 can also or alternatively be configured to avoid sending batch messages during the carrier's busy hour(s), thereby minimizing load pressures on the wireless network.

The use of an MDC 150 can aid the wireless carrier's network significantly, e.g., by forwarding short messages only when the relative handsets are turned on. Under this scenario, subscriber queues are not processed when the handset is powered off. This can reduce network storage requirements, delivery retry attempts, and overall SS7 usage. The MDC 100 can do this either by interacting with appropriate applications, e.g., with a mobile chat location register (MCLR), or generally by intelligent use of SMS delivery receipt data from the SMSC and Web Gateway. A suitable mobile chat location register (MCLR) is shown and described in U.S. application Ser. No. 09/814,363, entitled "Wireless Chat Automatic Status Tracking", filed Mar. 23, 2001 by Ung et al., the entirety of which is expressly incorporated herein by reference.

Mobile Chat Location Register (MCLR)

The principles of the present invention may be used to implement a wireless chat tracking system (i.e., Mobile Chat Location Register (MCLR)) which utilizes a change in mobile registration status to automatically notify a chat group system outside the wireless network of current status information activity regarding a relevant device, e.g., registration activity or inactivity timeout.

In a disclosed embodiment, a registration notification (REGNOT) message is either explicitly forwarded or copied to an external IP based application (e.g., to a mobile chat group system). The change in mobile registration is communicated via a suitable signaling link (e.g., SS7, ICP/IP, etc.) between a Home Location Register (HLR) and the chat group system. Therefore, instead of a conventionally closed system using SS7 messages, REGNOT messages are pushed out over TCP/IP connections to external application (e.g., chat servers) to automatically notify the external system of the location of a particular user.

In accordance with the principles of the present invention, a REGNOT message may be simply forwarded in accordance with instructinos from an HLR, or all REGNOT messages received may be copied and forwarded to an external application, which then sifts through the copied and received REGNOT messages for messages of relevance to that particular external application.

The MDC 100 can further be configured to send content from various providers to certain SMPP ports on a short message service center (SMSC). The receipt of such content allows distinct billing records to be generated for each type of service, e.g., ads, general content, premium content, etc.

Figure 2:
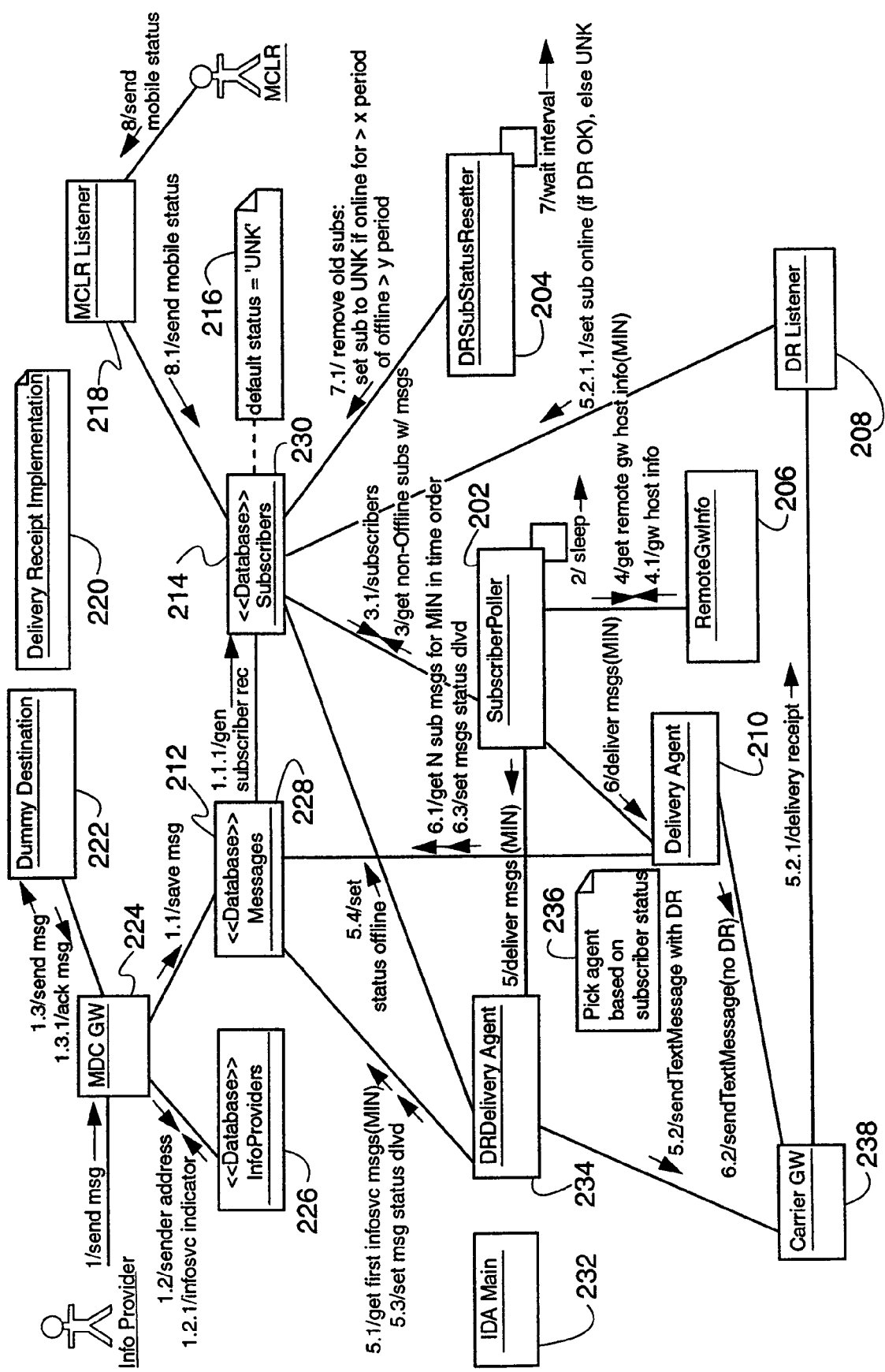
FIG. 2 illustrates exemplary software components and their relationships in an embodiment of a message distribution center (MDC), in accordance with one embodiment of the present invention.

FIG. 2 illustrates exemplary software components and their relationships in an embodiment of a message distribution center (MDC), in accordance with one embodiment of the present invention.

In the disclosed embodiments, a Wireless Internet Gateway (WIG) was modified to include another 'dev/null' destination, which acknowledges short messages from a queueMonitor, but does not actually process them. The short messages remain in the Messages table of the database, where they are retrieved by a software component referred to herein as an "Intelligent Delivery Agent" (IDA).

The IDA retrieves messages from the Messages table in the database for subscribers, e.g., when they power on their handsets, subject to any desired rules. The IDA can become aware of subscriber power-ups through any appropriate trigger, e.g., via an SMPP Delivery Receipt mechanism, through Mobile Chat Location Register (MCLR) software, etc. Preferably, the IDA throttles short message traffic to any or all subscribers, e.g., optionally waiting until the busy hour is over before beginning the transmission.

The MDC Gateway 100 may be, e.g., a standard WIG to which the provider sends messages through SMTP, RMI, HTTP, or suitable middleware software. As shown in FIG. 2, the MDC 100 includes a new DummyDestination, which simply acknowledges receipt from a particular subscriber queue 150, but does not attempt delivery. Delivery may be accomplished through an Intelligent Delivery Agent process, which polls a messages table that is populated when the MDC Gateway 100 receives relevant short messages.

To most efficiently use the MDC gateway 100, the SMTP session preferably assigns the msgType property based on the sender's Email address and using InfoProviders information from the database. This allows the MDC Gateway 100 to determine that SMTP messages from an Information Provider (e.g., INFO@NEWS.COM) should use the Dummy Destination and be queried by the IDA. If the short message is submitted via an RMI mechanism, then the sender will explicitly define the msgType.

When the MDC 100 inserts a short message record, an Oracle™ trigger may be used to create a subscriber record in the Subscribers table in the database if such a record does not already exist for the recipient.

The Subscribers table may contain, preferably at a minimum, a MIN, status (e.g., 'Online', 'Offline', 'Unknown'), and the time of the last status update. When first created, the status may default to 'Unknown'.

The IDA may be a separate program that delivers messages from the database to appropriate recipients via a RemoteSMPP RMI Interface of the carrier's gateway. The IDA preferably determines subscriber availability via, e.g., an MCLR or via Delivery Receipts. The former approach is likely more efficient, but the latter approach is more likely to work with most carrier environments.

The Delivery Receipt method is considered to be more complicated. The Delivery Receipt method attempts to find the status of a subscriber's handset by examining delivery receipts from messages sent to the subscriber.

As shown in FIG. 2, a SubscriberPoller agent 202 starts the process by gathering a list of subscribers from a Subscribers table 214 at some time interval (z). If a particular subscriber is online, then the DeliveryAgent object 210 is notified.

The DeliveryAgent 210 then gathers some pre-configured number of messages in time order for the subscriber from the Messages table 228 in the database, and sends them to the Carrier gateway 238 for delivery to the subscriber. There is no delivery receipt associated with these messages, so if the subscriber's handset is turned off the short messages are not delivered and not resent. This is why it is preferred that only a pre-configured number of short messages be sent before the subscriber's status is checked again by SubscriberPoller 202.

If a subscriber's status is unknown, then a DRDeliverAgent 234 is notified to send one message via the Carrier gateway 238 to the subscriber with a delivery receipt requested. When it sends the message, it sets the subscriber status as offline so that the SubscriberPoller 202 will ignore that subscriber.

The delivery receipt will arrive at DR Listener 208. If the delivery receipt indicates failure, then the subscriber status is set as 'unknown', otherwise the subscriber status is set as 'online'. The SubscriberPoller 202 wakes up shortly thereafter to take advantage of the user going online.

Because there is no direct feedback from the handset, there is no conventional information received when a handset is turned off or on. DBSubStatusResetter 204 makes assumptions about how long a handset typically stays on or goes off. If a handset has been marked as online for a period of time (x), then DRSubStatusResetter 204 sets the corresponding subscriber status to 'unknown', which will restart the delivery receipt cycle again. If a subscriber has been marked as 'offline' for a different period of time (y), then the subscriber is marked as unknown, again restarting the delivery receipt cycle.

To summarize, there are three time periods involved in the Delivery Receipt method. Time x is the average time that a handset is online. Time y is the average time that a handset is offline. Time z is how often the Subscribers table 214 is polled for a list of subscribers.

The three periods mentioned (x, y, and z) must have a certain relationship to one another. Time z must be smaller than time x and time y. Time x and time y's relationship to one another doesn't matter. Time z must be smaller than time x so that when a subscriber goes online, messages are sent to it before time x expires and online subscribers are set to 'unknown'. Time z should be smaller than time y, otherwise the subscriber will be sent another message before DR Listener 208 has had a chance to receive the delivery receipt. This implies that time z will also be longer than the expected time for a delivery receipt.

A SubscriberCleanUp agent may be implemented to clean out subscribers that haven't had messages sent to them for a pre-defined period of time. This will ensure that the subscriber database doesn't grow without bound. Subscribers may have taken their name from the information provider's subscriber list.

Another technique mentioned above is to use an MCLR facility. In this situation, the MCLR will know explicitly when a handset is turned off or on. The MCLR Listener 218 then updates the Subscribers table 214 accordingly. The SubscriberPoller 202 always sees only online subscribers. It then uses the DeliveryAgent 210 to send the messages without a delivery receipt requested.

When the MCLR Listener 218 is active, then the DRDeliverAgent 234, DR Listener 208, and DBSubStatusResetter 204 are all inactive. When the three delivery receipt entities are active, then the MCLR Listener 218 is inactive.

The IDA Main 232 activates appropriate facilities based on a configuration file.

In an MCLR implementation, the DRDeliveryAgent 234, DR Listener 208, and DRSubStatusResetter 204 may not be used.

Figure 3:
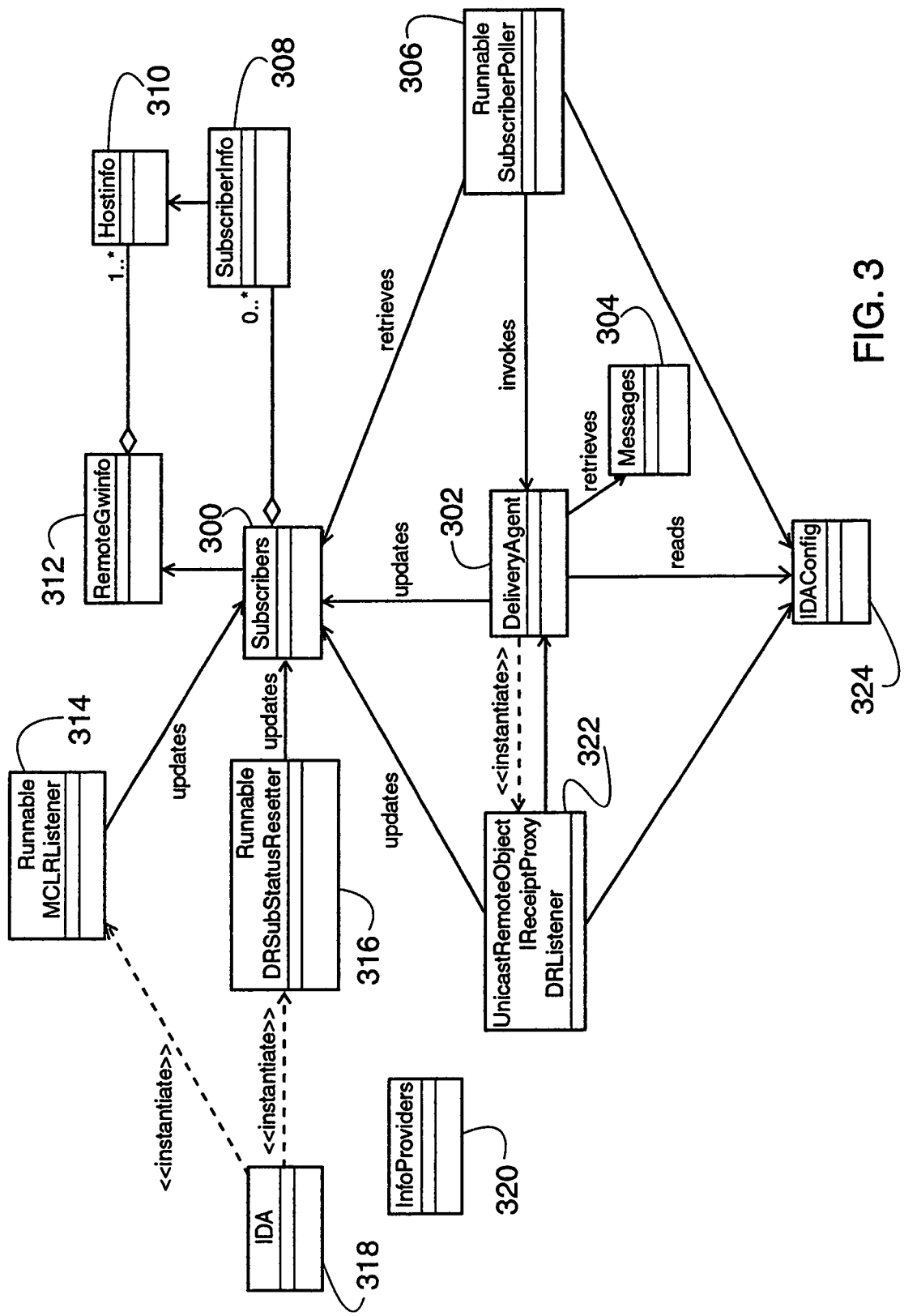
FIG. 3 is an exemplary class diagram which shows further details of an embodiment of a Message Distribution Center, in accordance with the principles of the present invention.

FIG. 3 is an exemplary class diagram which shows further details of an embodiment of a Message Distribution Center, in accordance with the principles of the present invention. In particular, FIG. 3 shows exemplary classes that may be activated and used to determine subscriber status and to actually deliver messages.

As shown in FIG. 3, an IDA main class 318 is responsible for deciding which subscriber status determination strategy to use. The IDA class 318 may receive this information from a configuration file. The IDA class 318 instantiates and activates an MCLRListener class 314 if that facility is to be used to retrieve a handset's online/offline status. If the strategy is to use delivery receipts, then the IDA class 318 instead instantiates and activates the DRListener 322 and DRSubStatusResetter 316 classes.

A SubscriberPoller 306 class gets a list of subscribers whose status is 'unknown' or 'online' from the database. If a subscriber's status is 'unknown', the SubscriberPoller 306 invokes a method in a DeliveryAgent class 302 to send a message requesting a delivery receipt. If the subscriber's status is 'online', then the DeliveryAgent 302 sends messages without a delivery receipt to the subscriber.

The DeliveryAgent 302 is responsible for averaging out the load on the carrier's system. It may do this by spreading out the messages over time, allowing normal traffic to be sent more quickly. The DeliveryAgent 302 may also hold off sending batch messages during the carrier's busy time. This information may be maintained in a configuration file and retrieved through a DeliverySetupInfo class.

The DeliveryAgent 302 can also be configured to send messages over certain SMPP ports to the carrier gateway 238 for tracking the amount of traffic that an information provider is sending. The DeliveryAgent 302 may accomplish this by tagging the message with a message type indicating that it is an MDC message. The configuration file may be set up so that messages of an MDC type will be sent to certain SMPP ports by the carrier gateway 238.

Both the Subscribers 300 and Messages 304 classes may be wrappers around their respective database tables, to isolate JDBC calls to these classes only and/or to place the data in a useful format.

The IDA 318 may send messages and/or decide blackout periods on a global basis, i.e., regardless of the destination of any particular message. One enhancement to this is to apply these on a per-carrier basis since carriers can be in different time zones or have more or less capable hardware.

One advantage provided by the present invention is that SMTP is a well-known protocol and an easy way for content providers to distribute their information.

A Message Distribution Center (MDC) in accordance with the principles of the present invention provides an ideal solution. It addresses the problems faced by the carrier without requiring the information providers to change technologies.

The principles of the present invention have applicability for usage with wireless intelligent network (WIN) and SMTP applications, e.g., those already otherwise containing a Internet gateway application for routing information through an SMTP gateway. Moreover, the MDC allows content providers to continue with their current mode of operation without placing the carrier's network at risk. The MDC can receive messages using a variety of protocols, including SMTP. It automatically routes messages to the appropriate carrier based on MIN range. Instead of delivering SMTP content directly to the carrier, it is delivered to the MDC. The MDC then ensures that the content is delivered in a 'carrier-friendly' manner.

MDC can provide the Info Provider with delivery statistics, e.g., what percentage of messages are being delivered.

The MDC helps prevent the carrier from being overwhelmed by bulk messaging content and provides the following benefits:

bulk message traffic is distributed across time
messages are delivered over more efficient protocols than SMTP through the carrier's Wireless Internet Gateway
messages are only delivered when handsets are on, thereby eliminating network storage and retries
messages are delivered with appropriate urgency, delivery receipt, expiration times, and billing identifiers
individual bulk message queues allow the carrier to limit the number of messages that can be queued per subscriber
bulk messaging can be disabled for individual accounts when subscribers churn
bulk message delivery statistics are available to the carrier via a web interface.

Acknowledgement of Delivery Receipts

It is preferred that remote gateways be sent to via a remote queue. This is because of the uncertainty about the link IDs which would be used by the remote gateway per MIN. Rather, all that is known is that a gateway takes a certain range of MINs. However, the gateway itself may partition out the MINs to be sent via different protocols such as SMPP, TNPP or others. That information is preferably not kept at the IDA 318, preventing use of the remote SMPP classes. However, the remote queue has no provision for sending information back. It is preferred that this ability be provided so as to receive back delivery receipts.

In accordance with the principles of the present invention, a ReceiptNotifier class may be added to the code. When such a ReceiptNotifier class detects that a delivery receipt is to go back to the IDA 318 (i.e., a hostname or IP is in receiptEmail, receiptMIN or a new receipt field in the Message class 304), it establishes a connection with the IDA 318 and sends back the receipt information.

Two exemplary methods to receive back at the IDA 318 the delivery receipt, both involving gateway software running at a remote site to recognize first that a delivery receipt is necessary. One was discussed above, while the other establishes a connection back to the IDA 318 and a protocol to use. In accordance with the principles of the present invention, RMI techniques may be used to accomplish this.

When the remote gateway sees an IDA delivery receipt request, it may perform a Naming.lookup( ) based on the URL in the delivery receipt field in the Message. It then sends the message name field from the Message and the delivery status. Once sent, it can abandon the object it got back from the Naming.lookup( ) call.

This implies that the remote gateway will be an RMI client to the IDA delivery receipt server. Typically the remote gateway has been acting as an RMI server. However, this scheme of being a client falls in line with how the SMTP delivery receipt is sent, that is, the remote gateway acts as a mail client in this case.

An IReceiptProxy interface 322 may be added to allow communication between the MDC gateway 100 and the IDA 318. The DRListener agent 322 in the IDA 318 preferably acts as an RMI server to receive the acknowledgements from the MDC gateway class ReceiptNotifier. The receiptEmail field in the Message preferably contains the hostname to respond back to. ReceiptNotifier distinguishes between email addresses and host names in this field and sends the delivery receipt accordingly.

The IDA 318 is configured via appropriate configuration files, e.g., an ida.cfg file, an IdaRemoteHostInfo.properties file, and database tables (described more fully herein below). It is preferred that the IDA 318 use the same database as the MDC gateway 100. The MDC gateway 100 and the IDA 318 preferably utilize tables and configuration/property files, which should be set up correctly. In operation, the setup of MDC and IDA configuration/property files is typically the responsibility of an MDC administrator. Exemplary values for configurable files are provided herein below.

The MDC 100 and IDA 318 work together to handle the large amount of traffic generated by information providers. The MDC 100 automatically routes messages to the IDA 318 based on if the message is from an information provider. Instead of delivering SMTP content directly to the carrier, the MDC 100 delivers it to the IDA 318. The IDA 318 then ensures that the content is delivered in a 'carrier-friendly' manner.

The MDC Gateway 100 is started using a standard smsgw.sh script. The IDA 318 may be started separately with an ida.sh script. The only necessary dependency between the two programs is the database tables they share. This means that either can be started without the other running. However, nothing useful happens until both are running.

Table 1 describes relevant modules in the MDC Gateway 100.

TABLE 1

| Module Name | Package |
|---|---|
| Base36.java | tcs.ain.smsgw |
| Config.java | tcs.ain.smsgw |
| DummyDestination.java | tcs.ain.smsgw |
| IReceiptProxy.java | tcs.ain.smsgw |
| Message.java | tcs.ain.smsgw |
| MessageStoreDB.java | tcs.ain.smsgw |
| ReceiptNotifier.java | tcs.ain.smsgw |
| SMPPReceiptMessage.java | tcs.ain.smpp |
| SMPPResource.java | tcs.ain.smpp |
| SMTPMessageData.java | tcs.ain.smsgw |
| SMTPSession.java | tcs.ain.smsgw |

Table 2 identifies relevant exemplary modules in an IDAm 318, packed in the exemplary embodiment in a "tcs.ain.ida" package and located in a directory in the MDC gateway 100, e.g., called "smswebgw".

TABLE 2

| Module Name |
|---|
| DRListener.java |
| DRSubStatusResetter.java |
| DeliveryAgent.java |
| HostInfo.java |
| IDA.java |
| IDAConfig.java |
| IdaDebug.java |
| InfoProviders.java |
| MCLRListener.java |
| Messages.java |
| RemoteGwInfo.java |
| SubscriberInfo.java |
| SubscriberPoller.java |
| Subscribers.java |

The MDC Gateway 100 uses a number of database tables. The following are exemplary configurable tables 500 specifically used by the MDC Gateway 100 and the IDA 318.

INFOPROVIDER Configuration Table

An INFOPROVIDER table provides a list of information providers. If an information provider is on this list, the MDC Gateway 100 will route a relevant message to the IDA 318. The INFOPROVIDER table is used only by the MDC Gateway 100.

The INFOPROVIDER table is preferably configured by an appropriate system administrator.

TABLE 3

| Column | Data Type | Null? | Notes |
|---|---|---|---|
| MSGSENDER | CHAR(150) | N | Should match what the information provider puts in the sender field in mail |
| LASTUPDATE | NUMBER | Y | Currently unused. Should represent time when row was inserted |
| INFOPROVIDERID | NUMBER(9) | Y | |
| PROVIDERNAME | VARCHAR2(50) | Y | |
| SERVERID | VARCHAR(50) | Y | |
| SERVERPASSWORD | VARCHAR2(50) | Y | |

LINKID_NPANXX Configuration Table

A LINKID_NPANXX configurable table, used by both the MDC gateway 100 and the IDA 318 associates a MIN with a carrier's remote gateway. Link IDs are defined for each carrier in a GWDest.properties file from smswebgw/smsgw. The IdaRemoteHostInfo.properties file mentioned in the next section should align with the link IDs.

The LINKID_NPANXX table is preferably configured by an appropriate administrator.

TABLE 4

| Column | Data Type | Null? | Notes |
|---|---|---|---|
| LINKID | NUMBER(2) | Y | This number is an ID assigned to each carrier with a remote gateway to which the IDA can send messages. |
| NPA_NXX | VARCHAR2(6) | N | Represents the first 6 digits of a MIN and is used to assign a MIN to a remote gateway. |

MESSAGES Configuration Table

A MESSAGES table contains information about a message being sent. The MESSAGES table may be used by both the MDC gateway 100 and the IDA 318.

TABLE 5

| Column | Data Type | Null? |
|---|---|---|
| MSGTYPE | NUMBER(2) | Y |
| MSGSOURCE | NUMBER(2) | Y |
| MSGSTATUS | NUMBER(2) | Y |
| MSGSUBSTATUSDESC | VARCHAR2(255) | Y |
| MSGMIN | VARCHAR2(30) | Y |
| MSGCALLBACK | VARCHAR2(30) | Y |
| MSGSENDER | VARCHAR2(150) | Y |
| MSGSUBJECT | VARCHAR2(255) | Y |
| MSGTEXT | VARCHAR2(2000) | Y |
| MSGSRCADDR | VARCHAR2(150) | Y |
| SMSCMSGID | VARCHAR2(10) | Y |
| RECEIPTEMAIL | VARCHAR2(70) | Y |
| RECEIPTMIN | VARCHAR2(30) | Y |
| RECEIPTCALLBACK | VARCHAR2(30) | Y |
| MSGNAME (the unique identifier (key)) | VARCHAR2(20 | N |
| SRCGWID | VARCHAR2(5) | Y |
| MSGARRIVE | NUMBER | Y |
| MSGSENT | NUMBER | Y |
| MSGFINAL | NUMBER | Y |
| MSGSUBMIT | NUMBER | Y |
| MSGEXPIRE | NUMBER | Y |

SUBSCRIBERS Configuration Table

A SUBSCRIBERS table is used internally by the IDA 318. It keeps track of subscribers that have been sent messages by an information provider. The SUBSCRIBERS table is used by both the MDC Gateway 100 and the IDA 318.

TABLE 6

| Column | Data Type | Null? | Notes |
|---|---|---|---|
| SUBSCRIBERMIN | VARCHAR2(30) | N | |
| STATUS | NUMBER(2) | N | Internal value (0 - offline, 1 - online, 2 - unknown) |
| LASTSTATUSUPDATETIME | NUMBER | Y | Last time the status was changed |
| LASTMSGTIME | NUMBER | Y | Last time the subscriber received a message |

There is only one trigger in the exemplary embodiments defined for the IDA 318, called subsc_update. Whenever a message is added to the MESSAGES table, the subscriber is added or updated in the SUBSCRIBERS table if the message is from an information provider. This may be indicated, e.g., by bit 6 being set in an msgsource field.

IDA Configuration File

An ida.cfg file contains parameters that control the behavior of the IDA program 318. It is preferred that the ida.cfg file reside in the same directory as the executing IDA program 318. Table 7 shows exemplary parameters and values of an ida.cfg file, in accordance with the principles of the present invention.

TABLE 7

| Parameter | Purpose | Field Value | Field Explanation |
|---|---|---|---|
| *General Parameters* | | | |
| SubscriberStrategy | Strategy used to find subscriber status | DELIVERY_RECEIPT (default) | Have the remote gateway request a delivery receipt |
| | | MCLR | Use mobile chat location register (not implemented yet) |
| debugmode | Used to set the IDA to print run-time debug messages | true | Turn on run-time messages |
| | | false (default) | Turn off run-time messages |
| RemoteQueueName | Name of remote queue to send messages to | RemoteQueue (default) | Only changed for debugging purposes |
| DRServerName | Name of service to receive delivery receipts | DeliveryReceiptServer | Only changed for debugging purposes |
| LogFileName | Name of file to receive log messages | text string | Absolute or relative path to a logger file Directory must exist already. |
| *Database Parameters* | | | |
| DbClass | The driver to use for talking with the database | text string | Class name to use for database access. System must be configured with proper drivers |
| DbUrl | The reference to the database and machine where database resides | text string | Legal URL for the driver |
| DbAccount | Account name | text string | |
| DbPassword | Password to account | text string | |
| *Delivery Setup Parameters* | | | |
| MsgGroupSize | Number of messages to send to a subscriber at a time | number | |
| MsgSendRate | Number of messages to send per minute | number | |
| MsgHoldTimes | Time to not send msgs (local time). Repeat the line for multiple periods | Start time and end time in 24 hour format, HHMM | Must have start and end times. If end is less than start, then cross over of midnight is assumed. |
| *Polling/Expiration Rates Parameters* | | | |
| SubscriberOnlineTime | Maximum number of seconds a subscriber stays online | number | |

TABLE 7-continued

| Parameter | Purpose | Field Value | Field Explanation |
|---|---|---|---|
| SubscriberOfflineTime | Maximum number of seconds a subscriber stays offline | number | |
| SubscriberXmitPoll Time | Time between checks for subscriber messages (seconds) | number | This must be less than half the value of the smaller of SubscriberOnlineTime & SubscriberOfflineTime |
| SubscriberExpireTime | Hours without a message before a subscriber is purged. | number | |

IdaRemoteHostInfo.properties File

This file relates a link ID for a MIN to a remote host name, and whether it can support delivery receipts. A leading number followed by an underscore corresponds to the link ID in the LINKID_NPANXX table and the GWDest.properties file.

The form of an entry in the disclosed IdaRemoteHostInfo-.properties file may be, e.g., <linkid>_<parameter>=value. Permissible parameters and their values for the exemplary IdaRemoteHostInfo.properties files are shown in Table 8.

TABLE 8

| Parameter | Purpose | Values |
|---|---|---|
| carrierName | Short form of the carrier name | Text string |
| carrierNameLong | Long form of the carrier name | Text string |
| carrierHostname | The host name of the machine with the carrier's remote gateway | The name must be resolvable via DNS. |
| receiptSupported | Indicates if remote gateway can send delivery receipts. The gateway must be running the updated version of TCS gateway software and have enable_web in smscgw.cfg set to true | true, yes, false or no |

Table 9 is an example showing how the carrier data may be formatted in the IdaRemoteHostInfo.properties file.

TABLE 9

```
0_carrierName=AT
0_carrierNameLong=AirTouch
0_carrierHostname=Sms2way.airtouch.net
0_receiptSupported=yes
3_carrierName=BAM
3_carrierNameLong=Bell Atlantic Mobile
3_carrierHostname=smsc.bam.com
3_receiptSupported=yes
24_carrierName=FR
24_carrierNameLong=Frontier
24_carrierHostname=msg.frontiercellular.com
24_receiptSupported=no
```

MDC Configuration File

An smscgw.cfg file may be used to configure the software of the MDC Gateway 100. The disclosed MDC Gateway 100 requires several parameters to be set to route short messages from information providers to the IDA 318. The Remote Gateways that the IDA 318 talks to preferably have a flag such as "enable_web" set if they are to be capable of sending delivery receipts back to the IDA 318. Tables 10 and 11 show exemplary parameters in an MDC Configuration File, in accordance with the principles of the present invention.

TABLE 10 smscgw.cfg MDC Gateway Configuration

| Parameter | MDC Value | Notes |
|---|---|---|
| enable_mdc | yes | Causes check for information provider messages |
| enable_smtp | yes | Remote gateway routes mail to the IDA. |
| enable_web | yes | Allows remote queue calls via RMI |
| MessageStore Type | DB | IDA can only work with database activated |

TABLE 11 smscgw.cfg Remote Gateway Configuration

| Parameter | MDC Value | Notes |
|---|---|---|
| enable_web | yes | Allows remote queue calls via RMI |

While the invention has been described with reference to the exemplary embodiments thereof, those skilled in the art will be able to make various modifications to the described embodiments of the invention without departing from the true spirit and scope of the invention.

What is claimed is:

1. A method of delivering a text message, comprising:
    determining, through interaction with a mobile device registration register at an external IP based application, when a wireless device is turned on; and
    in response to a determination of said turned on condition, triggering delivery of a text message from a message distribution center to said wireless device, and foregoing delivery of said text message to said wireless device when said wireless device is not turned on.

2. The method of delivering a text message according to claim 1, wherein:
    said text message is transmitted to a destination wireless carrier using Remote Method Invocation (RMI) protocols.

3. The method of delivering a text message according to claim 1, wherein:
    said text message is transmitted to a wireless carrier using Short Message Peer-to-Peer (SMPP) protocols.

4. The method of delivering a text message according to claim 1, wherein:
    said delivery of said text message is automatic.

5. The method of delivering a text message according to claim 1, wherein:
   said text message is transmitted to a destination gateway using Simple Mail Transfer Protocol (SMTP).

6. The method of delivering a text message according to claim 1, further comprising:
   updating a subscriber table with an on/off status of said wireless device.

7. The method of delivering a text message according to claim 1, wherein:
   said determining is performed by said message distribution center.

8. The method of delivering a text message according to claim 1, wherein:
   said triggering is performed by said message distribution center.

9. The method of delivering a text message according to claim 1, wherein said text message comprises:
   a short message service (SMS) message.

10. The method of delivering a text message according to claim 1, wherein said mobile device registration register comprises:
   a mobile chat location register (MCLR).

11. The method of delivering a text message according to claim 1, wherein said external IP based application comprises:
   a mobile chat group system.

* * * * *